United States Patent
Kuwata et al.

(10) Patent No.: US 8,117,942 B2
(45) Date of Patent: Feb. 21, 2012

(54) VEHICLE HANDLE AND VEHICLE

(75) Inventors: Masaaki Kuwata, Shizuoka (JP);
Yoshihiro Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1076 days.

(21) Appl. No.: 11/609,182

(22) Filed: Dec. 11, 2006

(65) Prior Publication Data

US 2007/0151404 A1    Jul. 5, 2007

(30) Foreign Application Priority Data

Dec. 14, 2005    (JP) ................... 2005-360631

(51) Int. Cl.
  *B62K 21/12* (2006.01)
  *B62D 1/06* (2006.01)
  *G05G 1/10* (2006.01)
  *B25D 17/11* (2006.01)
  *B25D 17/00* (2006.01)

(52) U.S. Cl. ... 74/551.8; 74/557; 173/162.1; 173/162.2; 473/297; 473/300; 473/318

(58) Field of Classification Search ............ 74/551.1, 74/551.8, 488, 531, 543, 557; 173/162.2, 173/162.1; 191/64; 267/137; 473/297, 300, 473/318; *B62K 21/12, 11/14; B60K 20/02*
See application file for complete search history.

(56) References Cited

U.S. PATENT DOCUMENTS

| | | | | |
|---|---|---|---|---|
| 1,195,994 A | * | 8/1916 | Lard | 473/316 |
| 1,786,717 A | * | 12/1930 | Moore et al. | 191/64 |
| 1,848,892 A | * | 3/1932 | Kollmar | 74/543 |
| 2,101,869 A | * | 12/1937 | Noble | 267/137 |
| 3,845,827 A | * | 11/1974 | Schulin | 173/162.1 |
| 4,287,785 A | * | 9/1981 | Hunt | 74/488 |
| 4,611,671 A | * | 9/1986 | Hansson | 173/162.2 |
| 4,934,667 A | * | 6/1990 | Pees et al. | 267/64.21 |
| 5,575,722 A | * | 11/1996 | Saia et al. | 473/300 |
| 5,683,308 A | * | 11/1997 | Monette | 473/318 |
| 7,137,542 B2 | * | 11/2006 | Oki et al. | 173/162.2 |
| 7,140,973 B2 | * | 11/2006 | Rohrer | 473/300 |
| 7,267,619 B1 | * | 9/2007 | Pettis | 473/297 |
| 2009/0193930 A1 | * | 8/2009 | Ashman | 74/531 |

FOREIGN PATENT DOCUMENTS

| | | | |
|---|---|---|---|
| DE | 16719488 A1 | * | 11/1998 |
| JP | 60-034978 | | 3/1985 |
| JP | 1-103593 | * | 4/1989 |
| JP | 2-85557 | * | 3/1990 |
| JP | 6-321159 | * | 11/1994 |
| JP | 2003-81168 | * | 3/2003 |
| JP | 2009-161020 | * | 7/2009 |

OTHER PUBLICATIONS

JP 2003-081168 A, Akira, Mar. 19, 2003, English Translation PTO 11-0176.*

* cited by examiner

*Primary Examiner* — Vinh T. Luong
(74) *Attorney, Agent, or Firm* — Keating & Bennett, LLP

(57) ABSTRACT

A vehicle handle with improved vibration proof function. A balance weight has an inner balance weight portion with a center-of-mass positioned in a handle pipe, and an outer balance weight portion. A floating damper interposed between an outer periphery of the inner balance weight portion and an inner surface of the handle pipe supports the balance weight in one location that includes the center-of-mass of the balance weight.

10 Claims, 10 Drawing Sheets

VEHICLE HANDLE AND VEHICLE

RELATED APPLICATIONS

This application claims the benefit of priority under 35 USC 119 of Japanese patent application no. 2005-360631, filed on Dec. 14, 2005, which application is hereby incorporated by reference in its entirety.

BACKGROUND OF THE INVENTION

1. Field of the Invention

The present invention relates to a handle for motorcycles that has a vibration proof function.

2. Description of Related Art

A conventional vehicle handle with a vibration proof function is disclosed in JP-UM-A-60-34978, and illustrated in FIG. 10. Vehicle handle 100 comprises a handle pipe 101 having a hollow interior, a balance weight 102 arranged in the handle pipe 101, a screw rod portion 103 fixed at one end to the balance weight 102, a floating damper 104 interposed between the other end of the screw rod portion 103 and an inner surface of the handle pipe 101, a nut 105 threaded onto the screw rod portion 103, and a support piece 106 fixed to the nut 105 to support the screw rod portion 103 on the handle pipe 101. G denotes a center-of-mass position of the balance weight 102.

When vibrations from an engine, etc. are transmitted to the vehicle handle 100, the balance weight 102 rocks and vibrates about the support piece 106 against the elasticity of the floating damper 104. Vibrations of the handle 100 can be decreased by that damping action, which makes use of resonant vibrations of the balance weight 102. That is, resonant vibrations of the balance weight 102 are matched with and absorb resonant vibrations of the vehicle handle 100.

However, vibrations of the balance weight 102 consist of rocking vibrations and present frequency characteristics having a single resonance frequency as indicated by an alternate long and short dash line in FIG. 5, and damping is possible only in a band around this single resonance frequency.

SUMMARY OF THE INVENTION

The invention solves this problem and provides a vehicle handle with an improved vibration proof function.

One embodiment of the invention is a vehicle handle including a handle pipe, a balance weight with a center-of-mass positioned in the handle pipe, and a floating damper interposed between the balance weight and the handle pipe. The balance weight is supported in the handle pipe by the floating damper, and the center-of-mass of the balance weight is positioned in a portion of the balance weight that is supported in the handle pipe by the floating damper.

According to this embodiment, since a center of mass of the balance weight is supported by the floating damper, translational vibration, in which the balance weight vibrates radially, and rocking vibration, in which the balance weight vibrates about the center-of-mass position, are generated on the floating damper against the elasticity thereof when vibrations are transmitted to the handle, whereby peaks of a resonance frequency of the translational vibration and the rocking vibration of the floating damper can be readily matched with a peak of a resonance frequency of vibrations of the handle, thus effectively damping handle vibrations.

Also, according to this embodiment, since a damping effect is obtained in a frequency band between resonance frequencies of the respective modes of the balance weight, matching a frequency with a handle resonance frequency is easy and the vibration proof frequency band is widened.

Since a single floating damper is used, there are no increases in the number of parts, assembly time or costs. Since the floating damper is provided in a single location, the spring constant of the floating damper can be readily changed.

In another embodiment of the invention, the balance weight may comprise an inner balance weight portion arranged in the handle pipe and an outer balance weight portion connected to the inner balance weight portion and arranged outside an end of the handle pipe. In this embodiment, the weight and hence a resonance frequency of the balance weight can be readily regulated by exchanging one or both of the inner balance weight portion and the outer balance weight portion. Since the weight of the balance weight can be set without restriction by the space in the handle pipe, the range of resonance frequencies of the balance weight is increased. Also, the rocking vibration of the balance weight can be increased in amplitude without restriction by the space in the handle pipe.

In another embodiment, a notch may be formed centrally in an outer peripheral surface of the floating damper and outer ends of the damper on both sides of the notch may abut against an inner surface of the handle pipe. In this embodiment, a spring constant of the floating damper can be changed according to a width dimension of the notch. A spring constant in the rotational direction is not so much varied according to the width dimension of the notch although a spring constant of the translational vibration is varied according to the width dimension of the notch. Accordingly, without changing the resonance frequency of rocking vibration, the resonance frequency of translational vibration can be lowered by changing the width dimension of the notch, so that matching a frequency with a resonance frequency can be readily performed.

In another embodiment, the floating damper is a rubber damper formed by die forming, which can be fabricated at low cost as compared with a baked rubber damper.

In another embodiment, the floating damper comprises a contact portion that contacts circumferentially partially with an inner surface of the handle pipe. In this embodiment, a spring constant of the floating damper is decreased and insertion into the handle pipe is easy.

Another embodiment of the invention is a vehicle having a handle as described above.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
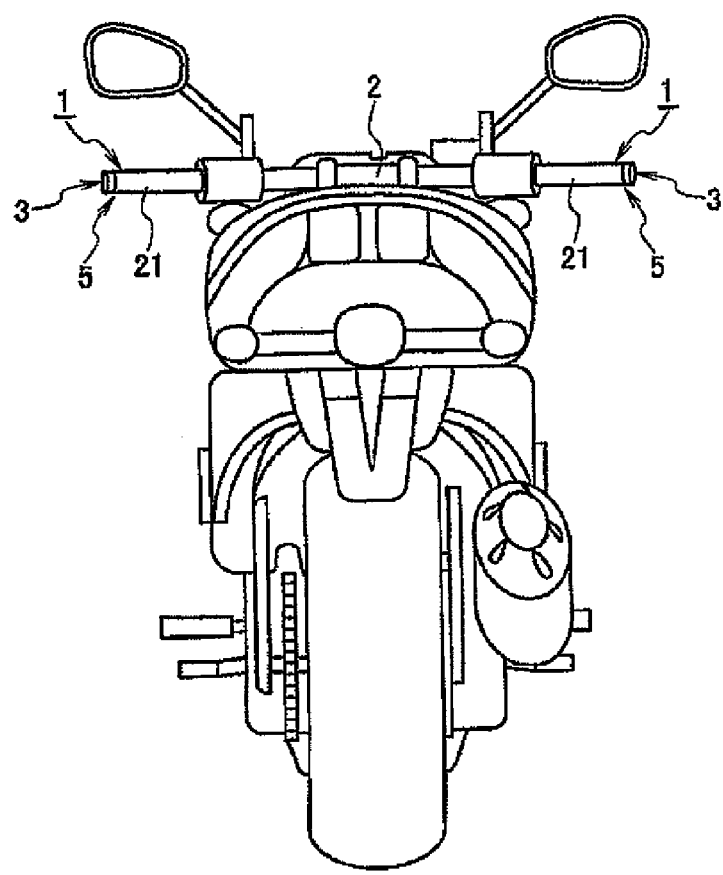
FIG. 1 is a rear view showing a vehicle handle according to the present invention mounted on a motorcycle.
Figure 2:
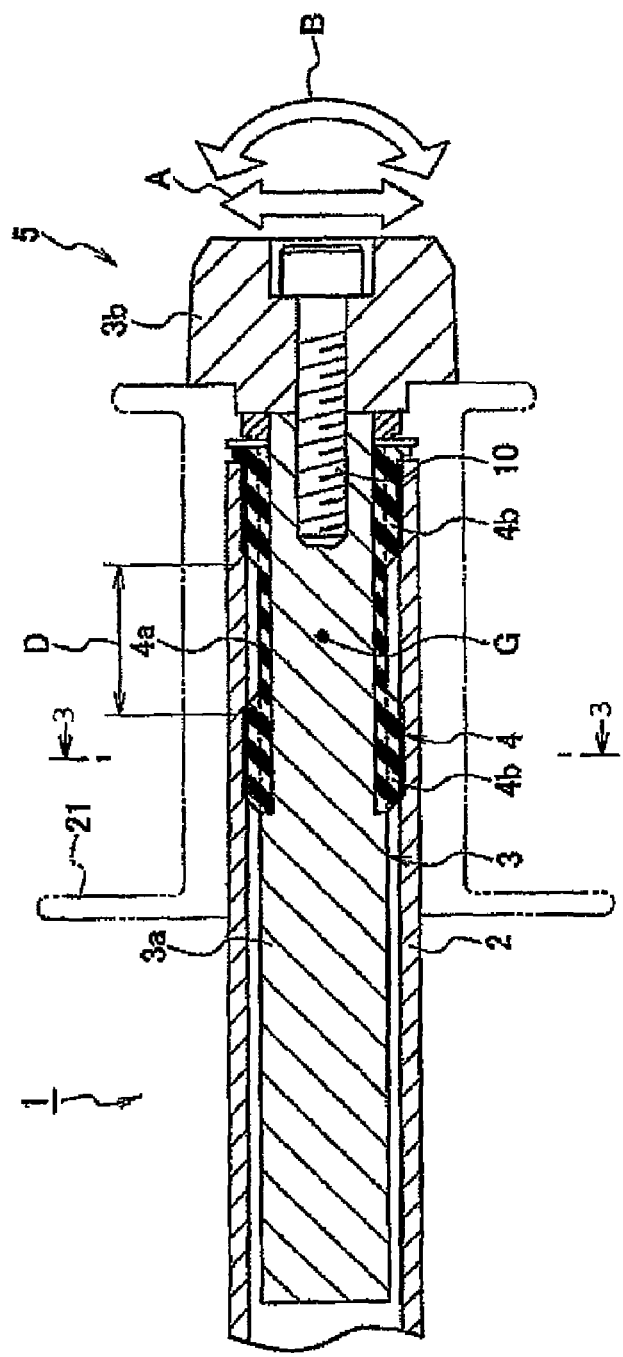
FIG. 2 is a cross sectional view of the handle.
Figure 3:
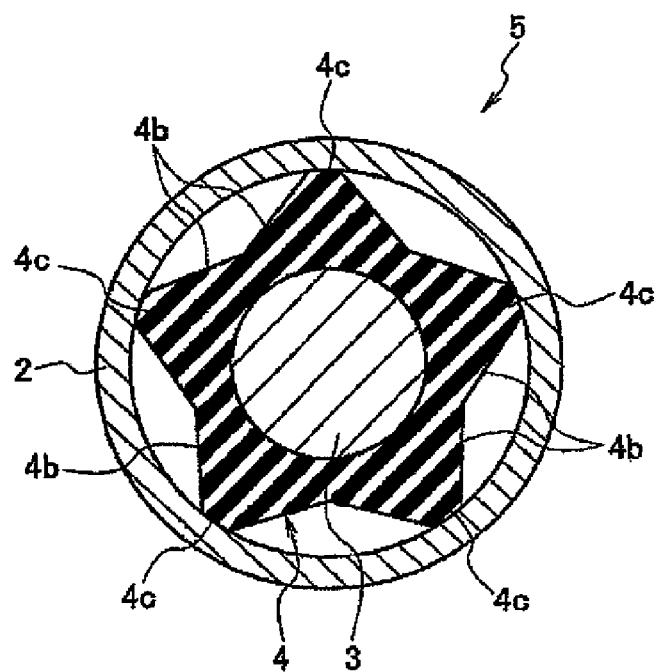
FIG. 3 is a cross sectional view of the handle taken along line 3-3 of FIG. 2.
Figure 4:
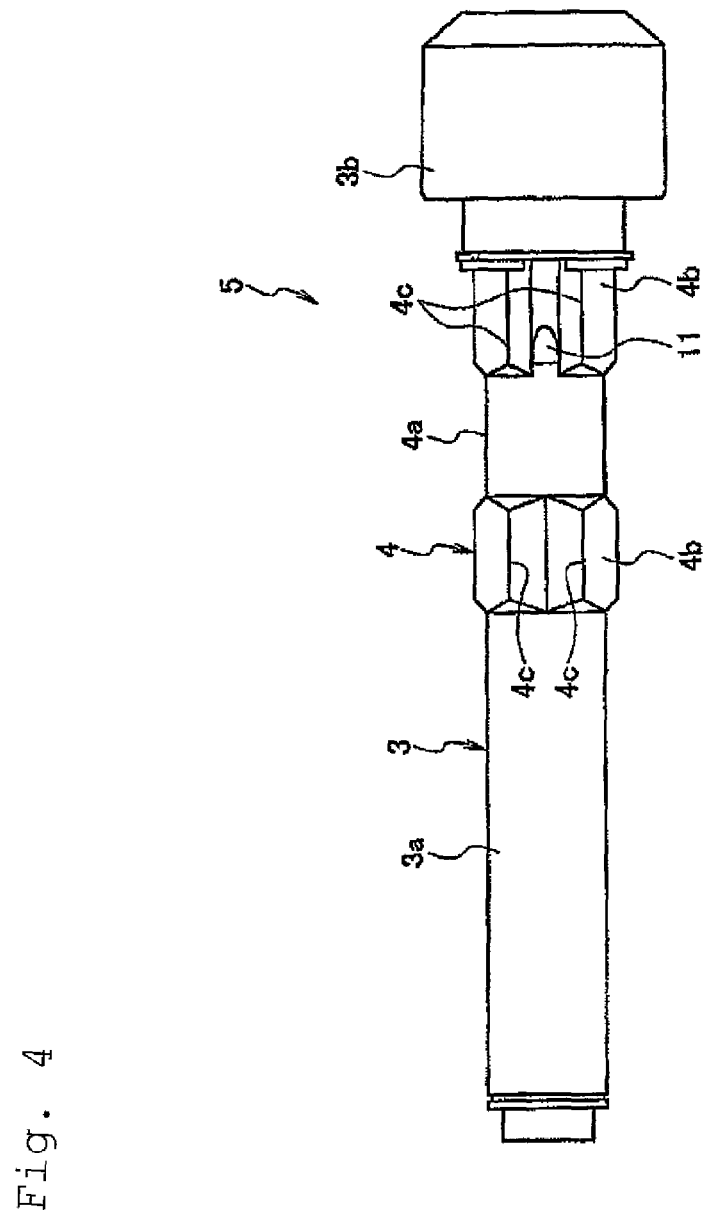
FIG. 4 is a side view showing the handle and a dynamic damper.

A first embodiment of the invention is described with reference to FIGS. 1-7. As shown in FIG. 1, a vehicle handle 1 is mounted on a motorcycle at an upper end of a steering shaft (not shown) in a vehicle left and right direction to steer a front wheel (not shown). As shown in FIGS. 2-4, the vehicle handle 1 comprises a cylindrical-shaped handle pipe 2, handle grips 21 at both ends of the handle pipe 2, and dynamic dampers 5 at both tip ends of the handle pipe 2. The dynamic dampers 5 comprise a balance weight 3 and a single floating damper 4 interposed between an outer periphery of the balance weight 3 and an inner surface of the handle pipe 2 to support the balance weight 3 only in one location.

The balance weight 3 comprises an inner balance weight portion 3a arranged in the handle pipe 2, and an outer balance weight portion 3b connected to the inner balance weight portion 3a through a bolt 10 and arranged outside an end of the handle pipe 2. The balance weight 3 has a center-of-mass position G in the inner balance weight portion 3a and is supported on the floating damper 4 in one location including the center-of-mass position G. Flexibly deformable latch pawls 11 (shown in FIG. 4) are provided protrusively in a plurality of locations on the inner balance weight portion 3a. The latch pawls 11 are latched in latch holes (not shown) of the handle pipe 2 whereby the balance weight 3 is fixed to the handle pipe 2.

The floating damper 4 is a molded rubber damper and has a cross sectional shape of a star shaped cylinder as shown in FIG. 3. A notch 4a is formed centrally and circumferentially of an outer peripheral surface of the floating damper 4. Only contact portions 4c formed in first and second locations 4b, 4b outside of the notch 4a, and projecting radially, abut against the inner surface of the handle pipe 2. Accordingly, a region of the floating damper 4 indicated by hatching in FIG. 6(a) expands and contracts at a time of translational vibration A, and a spring constant in a translational direction (radial direction) is varied according to a width dimension D of the notch 4a. In contrast, a region of the floating damper 4 indicated by hatching in FIG. 6(b) expands and contracts at a time of rocking vibration B, and a spring constant in a rotational direction is not so much varied according to the width dimension D.

Assembly of the vehicle handle 1 is now described. The floating damper 4 is inserted onto an outer periphery of the inner balance weight portion 3a. The balance weight 3 is then assembled by connecting the outer balance weight portion 3b to an end of the inner balance weight portion 3a by a bolt 10. The balance weight 3 is then inserted into the handle pipe 2 with the inner balance weight portion 3a as a tip end thereof. Latch pawls 11 of the balance weight 3 are latched in latch holes (not shown) of the handle pipe 2 to complete the assembly.

The action of the vehicle handle 1 is now described. Since the balance weight 3 is supported only in its center-of-mass position G on the floating damper 4, it is able to move against the elastic force of the floating damper 4 in a direction of translational vibration A and in a direction of rocking vibration B. Accordingly, when vibrations are transmitted to the vehicle handle 1, the balance weight 3 vibrates in a translational mode of vibration A, in which it vibrates radially, and a rocking mode of vibration B, in which it vibrates about the center-of-mass position G. Since the frequency characteristic of balance weight 3 has a resonance frequency f2 of translational vibration A and a resonance frequency f1 of rocking vibration B, damping can be achieved in regions around resonance frequencies f1, f2 (indicated by a solid line in FIG. 5) by matching the two-mode resonance frequencies f1, f2 with a handle resonance frequency, thereby improving the vibration proof function.

Figure 5:
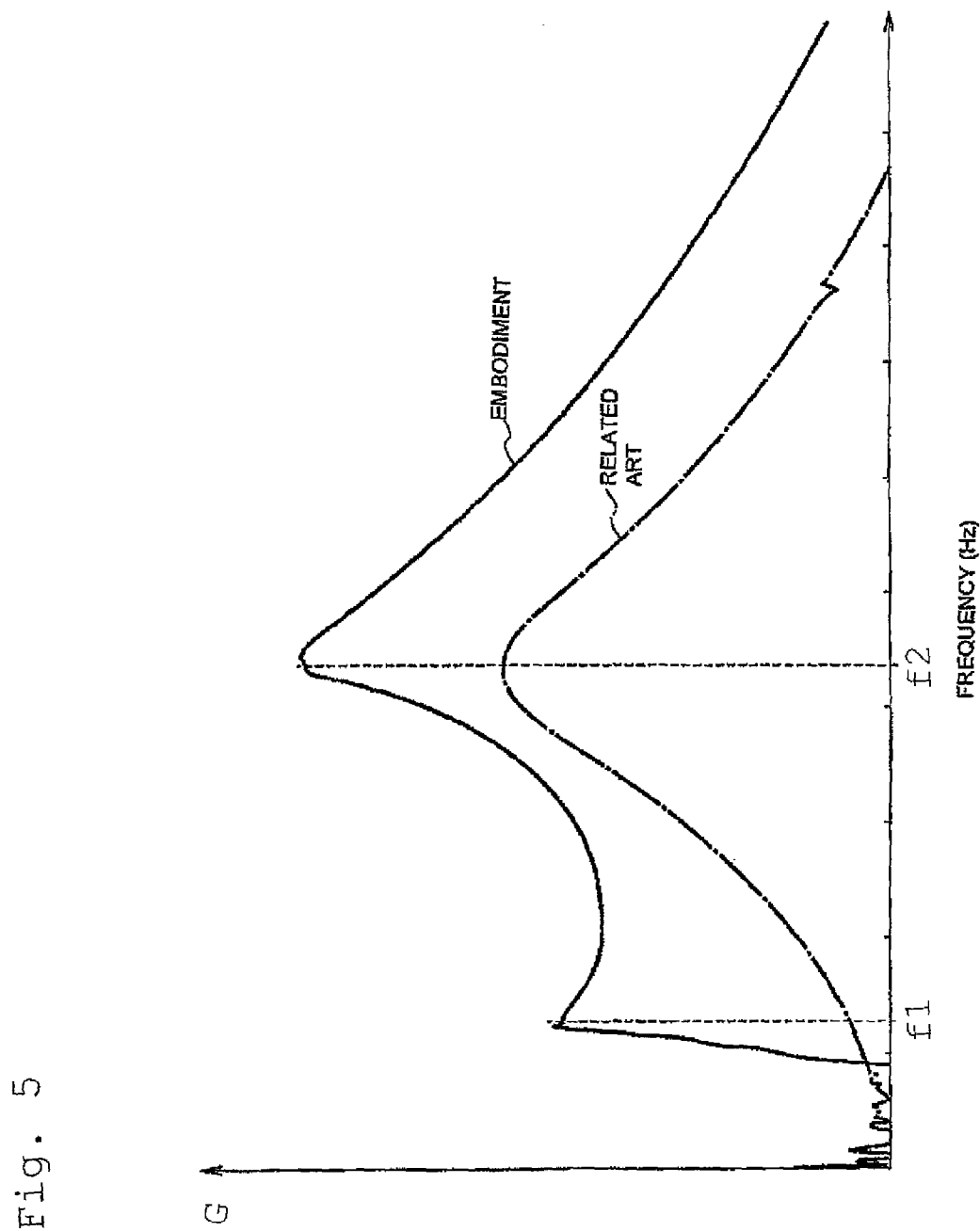
FIG. 5 is a frequency characteristic diagram of a balance weight according to the invention.

Since a damping effect is obtained in a frequency band between the resonance frequencies f1, f2 of the respective modes of the dynamic dampers 5, as indicated by a solid line in FIG. 5, matching the frequency with a handle resonance frequency is easy and the vibration proof frequency band is widened.

Since a single floating damper 4 is sufficient, increases in the number of parts, assembly time and costs are avoided.

Since the floating damper 4 is provided in a single location, a resonance frequency caused by a change in spring constant is easily predicted according to a shape and a dimension of the floating damper 4, so that matching the frequency with a handle resonance frequency is easy relative to a case where the floating dampers 4 are provided in a plurality of locations.

Since the balance weight 3 comprises the inner balance weight portion 3a arranged in the handle pipe 2, and the outer balance weight portion 3b connected to the inner balance weight portion 3a and arranged outside the end of the handle pipe 2, the weight and hence a resonance frequency of the balance weight 3 can be readily regulated by exchanging one or both of the inner balance weight portion 3a and the outer balance weight portion 3b. Since the weight of the balance weight 3 can be set without restriction by the space in the handle pipe 2, a greater range of resonance frequencies of the balance weight 3 is provided. Also, the rocking vibration B of the balance weight 3 can be enlarged in amplitude without restriction by the space in the handle pipe 2.

Figure 6A:
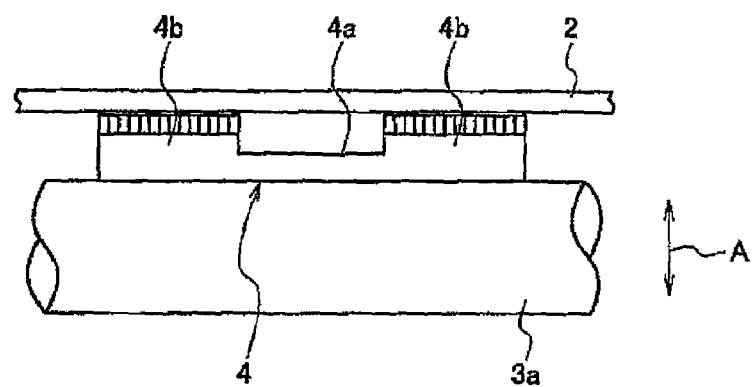
FIG. 6(a) shows a state in which a floating damper according to the invention is elastically deformed at a time of translational vibration.
Figure 6B:
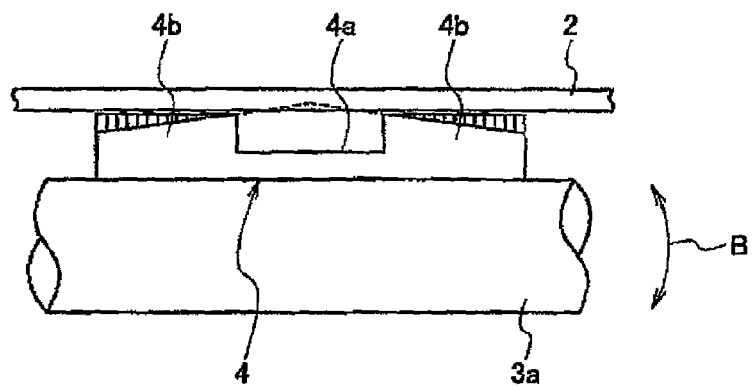
FIG. 6(b) shows a state in which the floating damper is elastically deformed at a time of rocking vibration.
Figure 7:
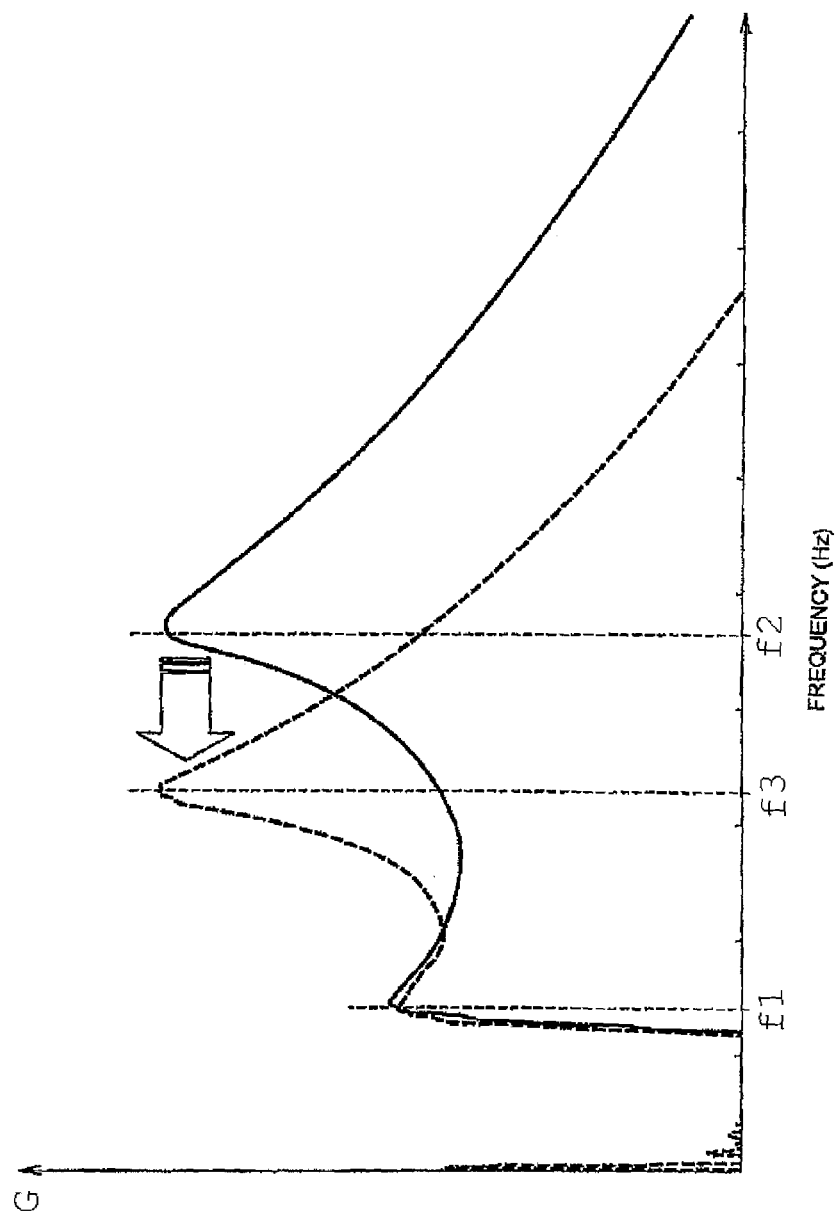
FIG. 7 is a frequency characteristic diagram illustrating a width dimension of a notch of the floating damper and a change in resonance frequency according to the invention.

The notch 4a is formed centrally and circumferentially of the outer peripheral surface of the floating damper 4 and only locations 4b, 4b outside of the notch 4a abut against the handle pipe 2. Accordingly, as shown in FIG. 6(a), the spring constant of the translational vibration A of the floating damper 4 is varied according to the width dimension D of the notch 4a. Specifically, as the width dimension D is increased, the spring constant is decreased and the resonance frequency f2 is gradually decreased. However, as shown in FIG. 6(b), the spring constant in the rotational direction is not so much varied according to the width dimension D. Accordingly, without changing the resonance frequency f1 of rocking vibration B, the resonance frequency f2 of translational vibration A can be lowered (a broken line in FIG. 7 indicates the case where the resonance frequency changes to f3) by changing the width dimension D of the notch 4a, so that the work of matching a frequency with a resonance frequency can be readily performed.

Since the floating damper 4 is a molded rubber damper, it can be fabricated at low cost as compared, for example, with a baked rubber damper.

Since the floating damper 4 contacts circumferentially partially with the inner surface of the handle pipe 2, the spring constant of the floating damper 4 can be decreased and insertion into the handle pipe 2 is easy.

Since the latch pawls 11 are provided on the balance weight 3 and latch holes (not shown) are provided on the handle pipe 2, the balance weight 3 can be easily assembled to the handle pipe 2 by inserting the balance weight 3 into the handle pipe 2 and latching the latch pawls 11 of the balance weight 3 in latch holes (not shown) of the handle pipe 2.

While the invention has been described as applied to the vehicle handle of a motorcycle, it is of course possible to apply the invention to a rod-shaped vehicle handle for small-sized three-wheelers, four-wheelers, water-scooters, etc.

Figure 8:
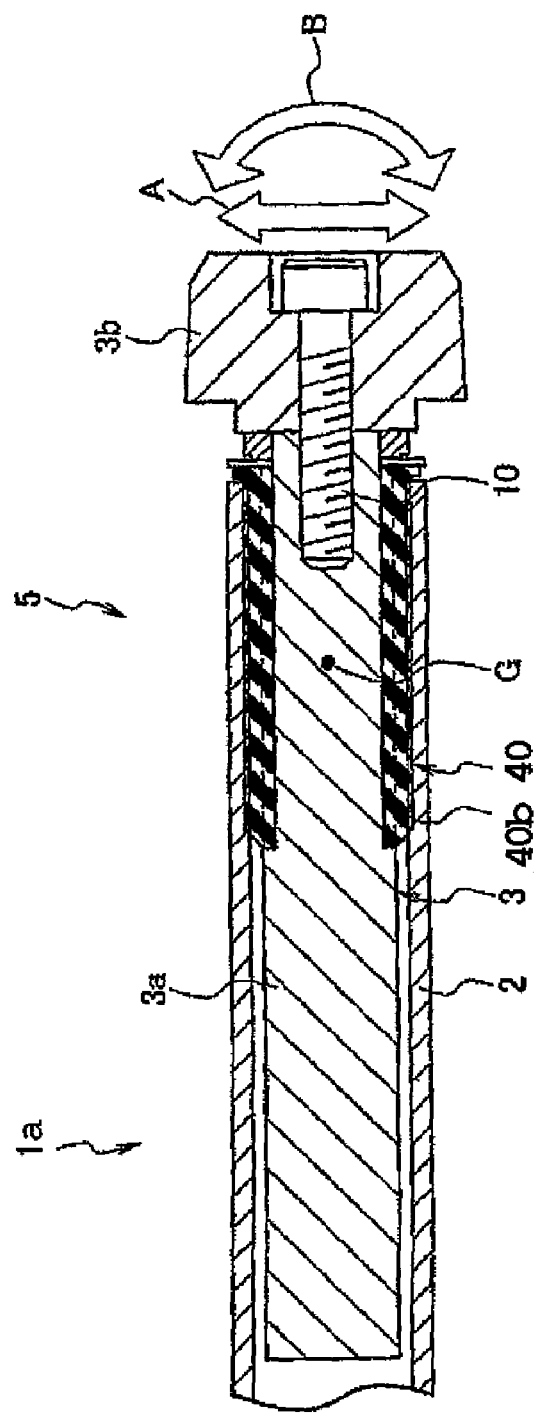
FIG. 8 is a cross sectional view showing a modification of the vehicle handle of the invention.
Figure 9:
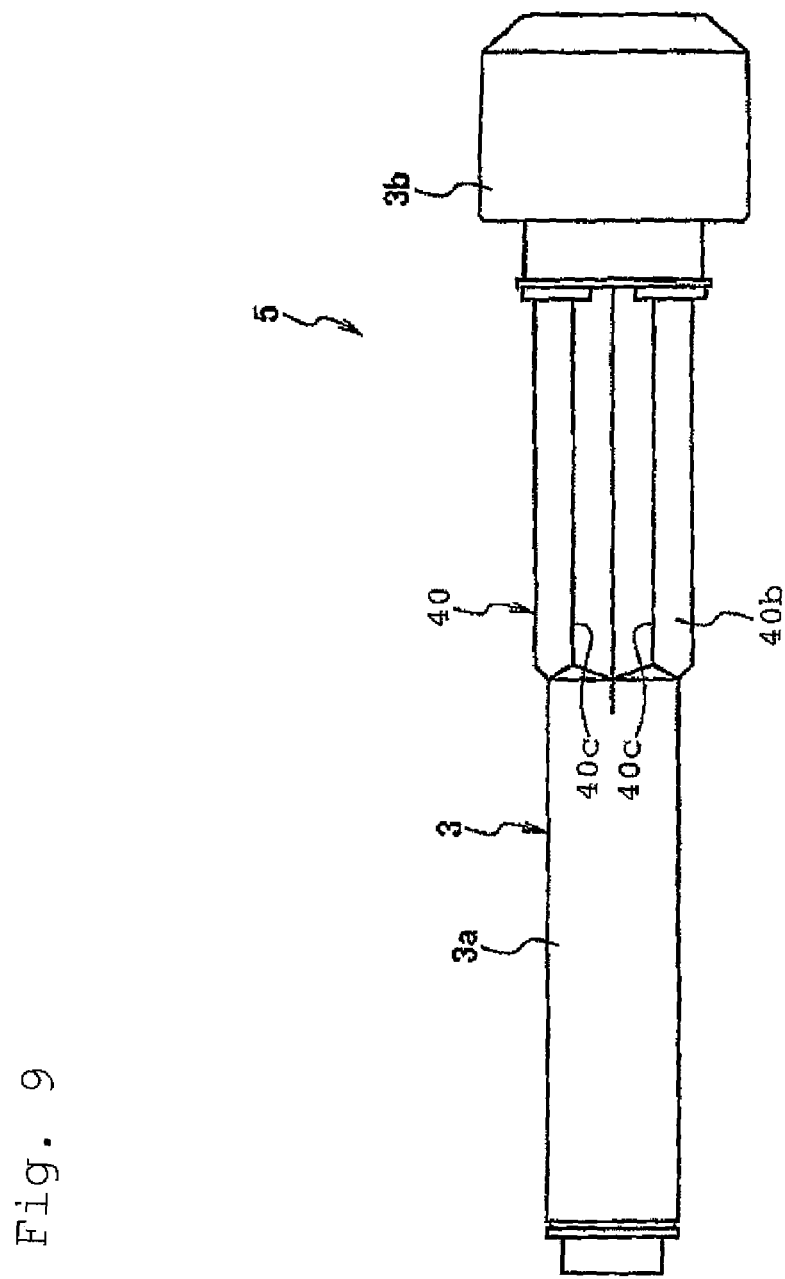
FIG. 9 is a side view of the modified handle of FIG. 8 and a dynamic damper.
Figure 10:
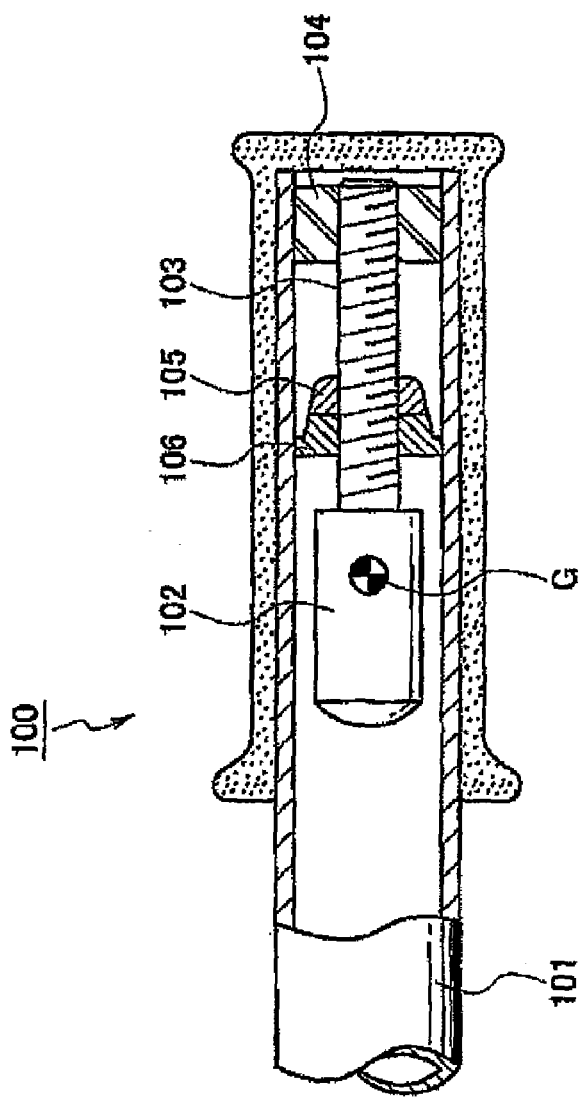
FIG. 10 is a cross sectional view showing a handle in the related art.

FIGS. 8 and 9 show a modified embodiment of the invention. The modified embodiment of FIGS. 8 and 9 differs mainly in the shape of the floating damper. The floating damper 40 of FIGS. 8 and 9 is not provided with a notch but contact portions 40c are formed in outside locations 40b, which are continuous toward one side from the other side. Since the remaining structure is the same as that in the first embodiment, an explanation therefor is omitted and the same constituent locations in the drawings are denoted by the same reference numerals.

The floating damper 40 is also a molded rubber damper and has a cross sectional shape of a star shaped cylinder as shown in FIG. 3. Only the contact portions 40c formed in outside locations 40b, 40b, which are continuous toward one side from the other side and project radially, abut against the inner surface of the handle pipe 2. Accordingly, a region of the floating damper 40 indicated by hatching in FIG. 6(a) expands and contracts at the time of translational vibration A, and a spring constant in a translational direction (radial direction) becomes larger than that in the case where a notch is provided, so that even higher resonance frequencies of translational vibration A can be accommodated.

In the modified embodiment, the balance weight 3 generates translational vibration A, in which it vibrates radially, and rocking vibration B, in which it vibrates about a center-of-mass position, in the same manner as in the first embodiment, so that peaks of a resonance frequency of the translational vibration and the rocking vibration of the floating damper 4 can be readily matched with a peak of a resonance frequency of vibrations of the vehicle handle 1a, thus effectively damping vibrations of the vehicle handle 1a.

Since a damping effect is obtained in a frequency band between the resonance frequencies of the respective modes of the balance weight 3, matching the frequency with a handle resonance frequency is easy and the vibration proof frequency band is widened.

Since a single floating damper 40 is provided, there are no increases in the number of parts, assembly time or costs.

Since the floating damper 40 is provided in a single location, the spring constant of the floating damper 40 can be readily changed.

Since the modified floating damper is simpler in shape than that of the first embodiment, a forming die required for molding is less expensive to manufacture.

The particular embodiments of the invention described in this document should be considered illustrative, rather than restrictive. Modification to the described embodiments may be made without departing from the spirit of the invention as defined by the following claims.

The invention claimed is:

1. A vehicle handle comprising:
   a handle pipe extending in a longitudinal direction;
   a balance weight with a center-of-mass positioned in the handle pipe; and
   a single floating rubber damper in contact with an inner surface of the handle pipe at least first and second locations spaced apart in the longitudinal direction of the handle pipe, the single floating rubber damper interposed between the balance weight and the handle pipe in a radial direction of the handle pipe, wherein
   the balance weight is supported in the handle pipe by the single floating rubber damper,
   the center-of-mass of the balance weight is positioned in a portion of the balance weight that is between the first and second locations of the single floating rubber damper, and
   the single floating rubber damper comprises a contact portion that only partially contacts circumferentially with the inner surface of the handle pipe.

2. The vehicle handle according to claim 1, wherein the balance weight comprises an inner balance weight portion arranged in the handle pipe and an outer balance weight portion connected to the inner balance weight portion and arranged outside an end of the handle pipe, the inner balance weight portion connected to the outer balance weight portion by a bolt.

3. The vehicle handle according to claim 2, wherein flexibly deformable latch pawls are provided in a plurality of locations on the inner balance weight portion to fix the balance weight to the handle pipe.

4. The vehicle handle according to claim 1, wherein a notch is formed centrally in an outer peripheral surface of the single floating rubber damper, and outer ends of the single floating rubber damper on sides of the notch abut against the inner surface of the handle pipe.

5. The vehicle handle according to claim 4, wherein a spring constant in the radial direction at a time of translational vibration varies according to a width dimension of the notch in an amount that is relatively greater than an amount by which a spring constant in a rotational direction is varied at a time of rocking vibration.

6. The vehicle handle according to claim 1, wherein the single floating rubber damper is formed by die forming.

7. The vehicle handle according to claim 1, wherein the single floating rubber damper has a cross-sectional shape of a star-shaped cylinder.

8. A vehicle comprising the vehicle handle according to claim 1.

9. The vehicle handle according to claim 1, wherein the balance weight is in contact with the inner surface of the handle pipe only via the single floating rubber damper.

10. The vehicle handle according to claim 1, wherein the single floating rubber damper is positioned, in the radial direction of the handle pipe, directly between the center-of-mass of the balance weight and the inner surface of the handle pipe.

* * * * *